H. M. LAMBERT.
TIRE MOLD.
APPLICATION FILED JAN. 2, 1920. RENEWED FEB. 4, 1921.
1,386,514.
Patented Aug. 2, 1921.
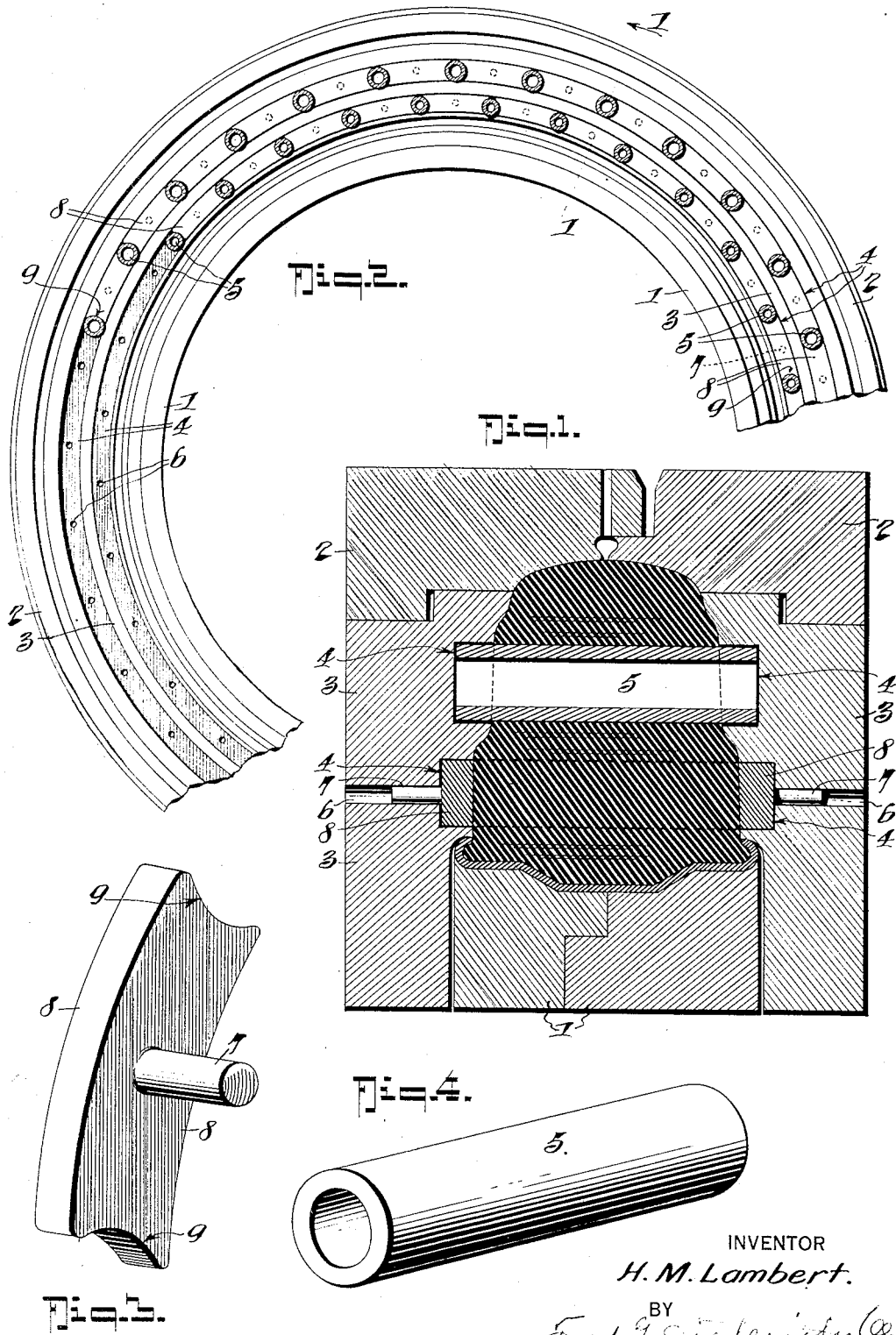

UNITED STATES PATENT OFFICE.

HENRY M. LAMBERT, OF PORTLAND, OREGON.

TIRE-MOLD.

1,386,514.  Specification of Letters Patent.  Patented Aug. 2, 1921.

Application filed January 2, 1920, Serial No. 348,759. Renewed February 4, 1921. Serial No. 442,592.

*To all whom it may concern:*

Be it known that I, HENRY M. LAMBERT, a citizen of the United States, residing at Portland, in the county of Multnomah and State of Oregon, have invented certain new and useful Improvements in Tire-Molds, of which the following is a specification.

My invention relates to certain new and useful improvements in tire molds for manufacturing solid or cushion tires, such as are known as the Lambert Trublpruf tires, which tires consist broadly of a plurality of concentrically arranged stretchless belts with interposed slabs of perforated rubber.

It has been the practice heretofore to build up these tires in molds which have removable core pipes inserted in holes in the side plates of the mold. This practice, however, has required the expenditure of considerable time in assembling the core pipes and molds, and it also takes considerable time to remove the mold plates and core pipes from the finished tire unless special punching devices are provided for removing the core pipes from the finished tire. My present invention therefore has for its object to provide a mold for making these tires of such construction and arrangement that the core pipes can be easily assembled and the time of assembly reduced to the minimum.

In its generic nature, the present invention consists in the provision of a mold structure comprising a base section, a tread section and a pair of side plates, the latter being provided with concentric annular grooves to receive the core pipes *seriatim*, the side plates having provision for the reception of removable spacer blocks to hold the core pipes properly spaced after they have been placed between the opposing side plates of the mold and in the grooves thereof.

The invention also resides in those novel details of construction, combination and arrangement of parts, all of which will be first fully described, then be specifically pointed out in the appended claims, and illustrated in the accompanying drawings, in which:—

Figure 1 is a detail vertical section on the line 1—1 of Fig. 2, showing the invention in use.

Fig. 2 is a central vertical section of the mold without the tire, illustrating the position of the core pipes and the spacer blocks.

Fig. 3 is a detail perspective view of one of the spacer blocks.

Fig. 4 is a detail perspective view of one of the core pipes.

In the drawing, in which like numerals of reference indicate like parts in all of the figures, 1 represents the base ring of the mold which preferably consists of a pair of lap-jointed ring plates provided with a surface to conform to the configuration of the base of the tire. 2 designates the tread section of the mold which also is preferably composed of a pair of lap-jointed ring plates. 3—3 designate the side plates of the mold which, in the present invention, each consist of single members that are provided with annular grooves 4—4 adjacent to the inner side of the mold to receive the core pipes or bars 5. The plates 3—3 are also provided with pin holes 6 to receive pins 7 on the backs of spacer blocks 8, the blocks 8 being curved to conform to the curvature of the grooves 4 and having their ends concaved as at 9 to conform to the curvature of the core pipes. In practice, the blocks 8 are of a thickness equal to the depth of the groove 4 so that the outer faces of the block 8 will conform to the molding surfaces of the mold plates 3.

In using the invention the base and side plates of the mold are assembled. The base structure of the tire is built up and then the core pipes 5 with their spacer blocks 8 forming the inner row of holes for the tire are put into position, and the rubber blocks used in the building of the tire are inserted between adjacent core pipes, after which the second annular belt is built up and then the next row of core pipes and spacer blocks 8 are positioned and so on until the tire has been built up to the tread; after which, the tread mold plates 2 are placed in position and the mold is then placed in a vulcanizing press, pressure being applied to the plates 3—3 toward each other as far as they may be permitted to move by reason of the limitations imposed by engagement of the parts 1 and 3 and 2 and 3 of the mold. The tire, while under these compressing strains is vulcanized, after which, the mold sections are prized apart in the usual way and the core pipes withdrawn from the tire in the usual way.

From the foregoing description, it will be seen that the assembling of the pipes and the positioning of the same with respect to the mold sides is made easy and there is no danger of the core pipes working laterally out of the mold side plates and thus the production of an imperfect tire is avoided.

What I claim is:—

1. In tire molds having base and tread forming sections and side plates to give form to the sides of a tire, said side plates having annular grooves adjacent to the molding face, core rods adapted to lie in said grooves and project from one side plate to the other, and spacer blocks carried by the side plates for spacing the core rods apart.

2. In tire molds having base and tread forming sections and side plates to give form to the sides of a tire, said side plates having annular grooves adjacent to the molding face, core rods adapted to lie in said grooves and project from one side plate to the other, spacer blocks carried by the side plates for spacing the core rods apart, said spacer blocks and side plates having interengaging portions for retaining said spacing blocks in position in the grooves of the side plates.

HENRY M. LAMBERT.